(12) United States Patent
Di Censo et al.

(10) Patent No.: US 10,720,153 B2
(45) Date of Patent: Jul. 21, 2020

(54) NAME-SENSITIVE LISTENING DEVICE

(71) Applicant: HARMAN INTERNATIONAL INDUSTRIES, INC., Stamford, CT (US)

(72) Inventors: Davide Di Censo, San Mateo, CA (US); Stefan Marti, Oakland, CA (US); Ajay Juneja, Mountain View, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 1031 days.

(21) Appl. No.: 14/106,369

(22) Filed: Dec. 13, 2013

(65) Prior Publication Data

US 2015/0170645 A1 Jun. 18, 2015

(51) Int. Cl.
*G10L 21/00* (2013.01)
*G10L 25/00* (2013.01)
(Continued)

(52) U.S. Cl.
CPC ............ *G10L 15/22* (2013.01); *G10K 11/178* (2013.01); *H04R 1/1083* (2013.01);
(Continued)

(58) Field of Classification Search
CPC . H04L 67/22; H04L 65/608; H04L 29/06027; G06F 17/30029; G06F 17/30867; G06F 3/167; G06F 16/90332; G06F 17/2785; G06F 3/165; G06F 3/16; H04Q 3/0016; H04R 2460/01; H04R 1/1083; H04R 2410/05; H04R 2430/01; G10L 21/0208; G10L 15/20; G10L 19/22;
(Continued)

(56) References Cited

U.S. PATENT DOCUMENTS 6,011,854 A * 1/2000 Van Ryzin ............. G08G 1/093
381/77
6,879,688 B2 4/2005 Winegar
(Continued)

FOREIGN PATENT DOCUMENTS

CN 101930789 A 12/2010
EP 1 909 532 A1 4/2008
(Continued)

OTHER PUBLICATIONS

International Search Report dated Feb. 26, 2015 in Application No. PCT/US2014/069130.
(Continued)

*Primary Examiner* — Michael Ortiz-Sanchez
(74) *Attorney, Agent, or Firm* — Artegis Law Group, LLP

(57) ABSTRACT

One embodiment of the present invention sets forth a technique for providing audio enhancement to a user of a listening device. The technique includes reproducing a first audio stream, such as an audio stream associated with a media player. The technique further includes detecting a voice trigger. The voice trigger may be associated with a name of a user of the listening device. The technique further includes pausing or attenuating the first audio stream and reproducing a second audio stream associated with ambient sound in response to detecting the voice trigger.

12 Claims, 11 Drawing Sheets

(51) Int. Cl.
  *G10L 15/22* (2006.01)
  *G10K 11/178* (2006.01)
  *H04R 1/10* (2006.01)
  *G10L 21/0208* (2013.01)
  *G10L 15/08* (2006.01)
  *H04R 1/40* (2006.01)

(52) U.S. Cl.
  CPC .... *G10L 21/0208* (2013.01); *G10L 2015/088* (2013.01); *G10L 2015/223* (2013.01); *H04R 1/1041* (2013.01); *H04R 1/406* (2013.01); *H04R 2420/01* (2013.01); *H04R 2420/07* (2013.01)

(58) Field of Classification Search
  CPC .......... G10L 25/78; G10L 2021/02082; G10L 2021/02087; G10L 21/02; G10L 21/0202; G10L 21/0205; G10L 15/22; G10L 17/00; G10L 2015/223; G10L 2021/02166; G10L 15/08; G10L 2015/225; G10L 21/06; G10L 25/51; G10L 25/93; G10L 15/222; G10L 2015/088; G10L 15/265; G10L 15/30; G10L 13/02; G10L 13/00; G10L 15/1822; G10L 15/00; G10L 21/0272; G10L 19/167; G10L 21/04; H04M 1/60
  See application file for complete search history.

(56) References Cited

U.S. PATENT DOCUMENTS

| | | | |
|---|---|---|---|
| 8,185,929 B2 * | 5/2012 | Cooper | G10L 21/04 |
| | | | 725/142 |
| 8,194,900 B2 | 6/2012 | Fischer et al. | |
| 8,285,244 B2 | 10/2012 | Kahn et al. | |
| 8,452,307 B1 * | 5/2013 | Fujisaki | H04W 64/006 |
| | | | 455/414.1 |
| 8,477,955 B2 | 7/2013 | Engle et al. | |
| 9,275,637 B1 * | 3/2016 | Salvador | G10L 15/01 |
| 9,324,322 B1 * | 4/2016 | Torok | G10L 15/22 |
| 9,437,188 B1 * | 9/2016 | Medina | G10L 15/08 |
| 9,635,420 B2 * | 4/2017 | Hoang | H04N 21/4436 |
| 9,646,628 B1 * | 5/2017 | Carlson | G10L 21/0208 |
| 2001/0046304 A1 | 11/2001 | Rest | |
| 2006/0094474 A1 | 5/2006 | Zatloukal et al. | |
| 2006/0153394 A1 | 7/2006 | Beasley | |
| 2007/0185601 A1 * | 8/2007 | Lee | G06F 3/16 |
| | | | 700/94 |
| 2007/0189544 A1 | 8/2007 | Rosenberg | |
| 2007/0285505 A1 * | 12/2007 | Korneliussen | H04N 7/147 |
| | | | 348/14.08 |
| 2008/0267416 A1 * | 10/2008 | Goldstein | H04R 1/1091 |
| | | | 381/56 |
| 2009/0082071 A1 * | 3/2009 | Hicks, III | G10K 11/1788 |
| | | | 455/570 |
| 2009/0138507 A1 | 5/2009 | Burckart et al. | |
| 2009/0279709 A1 * | 11/2009 | Asada | G10K 11/178 |
| | | | 381/71.1 |
| 2009/0290718 A1 * | 11/2009 | Kahn | H03G 3/32 |
| | | | 381/57 |
| 2010/0247082 A1 * | 9/2010 | Caldwell | G05B 23/0264 |
| | | | 386/326 |
| 2010/0332003 A1 | 12/2010 | Yaguez | |
| 2012/0034904 A1 * | 2/2012 | LeBeau | G10L 15/265 |
| | | | 455/414.1 |
| 2012/0051561 A1 | 3/2012 | Cohen et al. | |
| 2013/0223635 A1 * | 8/2013 | Singer | H04R 1/1041 |
| | | | 381/56 |
| 2013/0301837 A1 | 11/2013 | Kim et al. | |
| 2014/0270200 A1 | 9/2014 | Usher et al. | |
| 2014/0380075 A1 * | 12/2014 | Pulapaka | G06F 1/3293 |
| | | | 713/323 |
| 2015/0304761 A1 * | 10/2015 | Montazemi | H04R 1/1083 |
| | | | 381/72 |

FOREIGN PATENT DOCUMENTS

JP 2005192004 A2 7/2005
WO 92/06467 A1 4/1992

OTHER PUBLICATIONS

Extended European Search Report for Application No. EP 14869299.9 dated Jul. 13, 2017, 8 pages.

* cited by examiner

NAME-SENSITIVE LISTENING DEVICE

BACKGROUND

Field of the Embodiments of the Invention

Embodiments of the present invention generally relate to signal processing and, more specifically, to a name-sensitive listening device.

Description of the Related Art

Recent technological advancements in the consumer electronics industry have increased the portability and affordability of various types of media players, such as computers, mobile phones, and MP3 players. As a result, more and more consumers are integrating these types of devices into their daily lives. For example, an individual may use a computer to listen to music at work or use a mobile phone to listen to music or watch a video program during the commute to and from work.

In order to avoid disturbing others, many users listen to media players using a listening device, such as a pair of headphones. However, using headphones may reduce a user's ability to hear and communicate with those around the user, isolating the user from the surrounding environment. Moreover, many headphones provide noise-isolation and/or noise-cancellation functions designed to reduce the degree to which a user can hear ambient sounds. As such, a user may not be able to hear when someone is trying to get his or her attention. Additionally, in many cases, in order to communicate with others, the user must pause the media player and/or remove the headphones in order to converse with others.

As the foregoing illustrates, techniques that enable a user to more effectively interact with his or her surroundings while using a listening device, such as a pair of headphones, would be useful.

SUMMARY

One embodiment of the present invention sets forth a method for providing audio enhancement to a user of a listening device. The method includes reproducing a first audio stream and detecting a voice trigger associated with a name of a user of the listening device. The method further includes, in response to detecting the voice trigger, pausing or attenuating the first audio stream and reproducing a second audio stream associated with ambient sound.

Further embodiments provide, among other things, a listening device and a non-transitory computer-readable medium configured to carry out method steps set forth above.

Advantageously, the disclosed technique enables the user of a listening device to listen to an audio stream without isolating himself or herself from others. Additionally, the user is able to hear when his or her name is called and converse with others without removing the listening device and without manually pausing or attenuating the audio stream. Further, the disclosed technique enables the user to indicate to others that he or she does not want to be disturbed.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
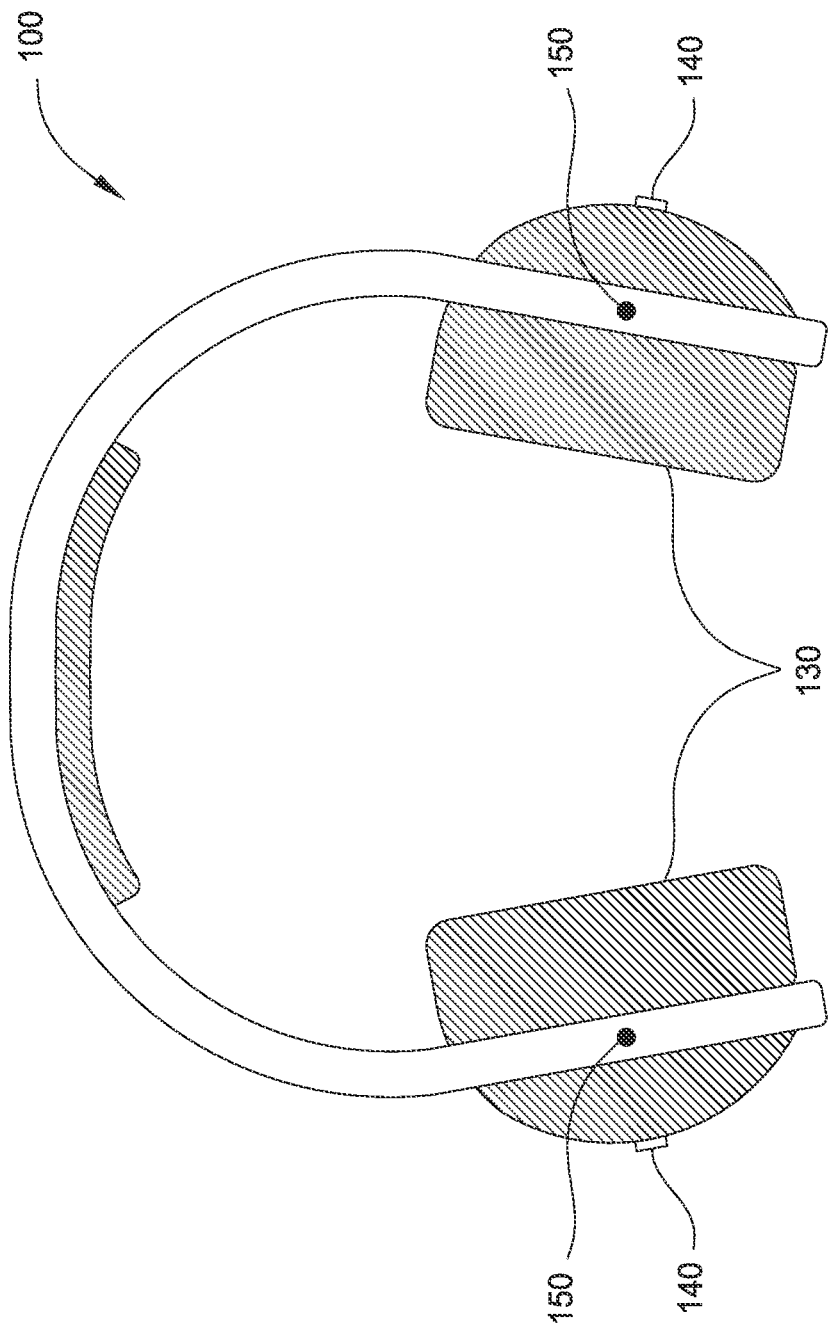
FIG. 1 illustrates a listening device, according to various embodiments of the present invention.

FIG. 1 illustrates a listening device 100, according to various embodiments of the present invention. The listening device 100 may include, without limitation, speakers 130, one or more microphones 140, and one or more visual sensors 150. The speakers 130 are configured to reproduce one or more audio streams for a user of the listening device 100. The microphone(s) 140 are configured to record ambient sound, including the voice(s) of one or more people near the user of the listening device 100. The visual sensor(s) 150 are configured to acquired images of the surrounding environment. For example, and without limitation, the visual sensor(s) 150 may be configured to acquire images of people near the user of the listening device 100 and/or images that enable the listening device 100 to determine the orientation of the user relative to the surrounding environment, as described below in further detail in conjunction with FIGS. 5A-5C and 6.

In various embodiments, the listening device 100 may include a pair of headphones, such as the over-the-ear headphones shown in FIG. 1. However, any type of wired or wireless headphones, including circumaural headphones, supra-aural headphones, and in-ear headphones, may be used to perform the techniques described herein. Further, the listening device 100 may include noise-isolation characteristics and/or a noise-cancellation function. In other embodiments, the listening device 100 may be any acoustic device that is able to amplify and reproduce sound for a user, including an assistive medical device, such as a hearing aid, or a mobile communication device, such as a Bluetooth® headset.

Figure 2:
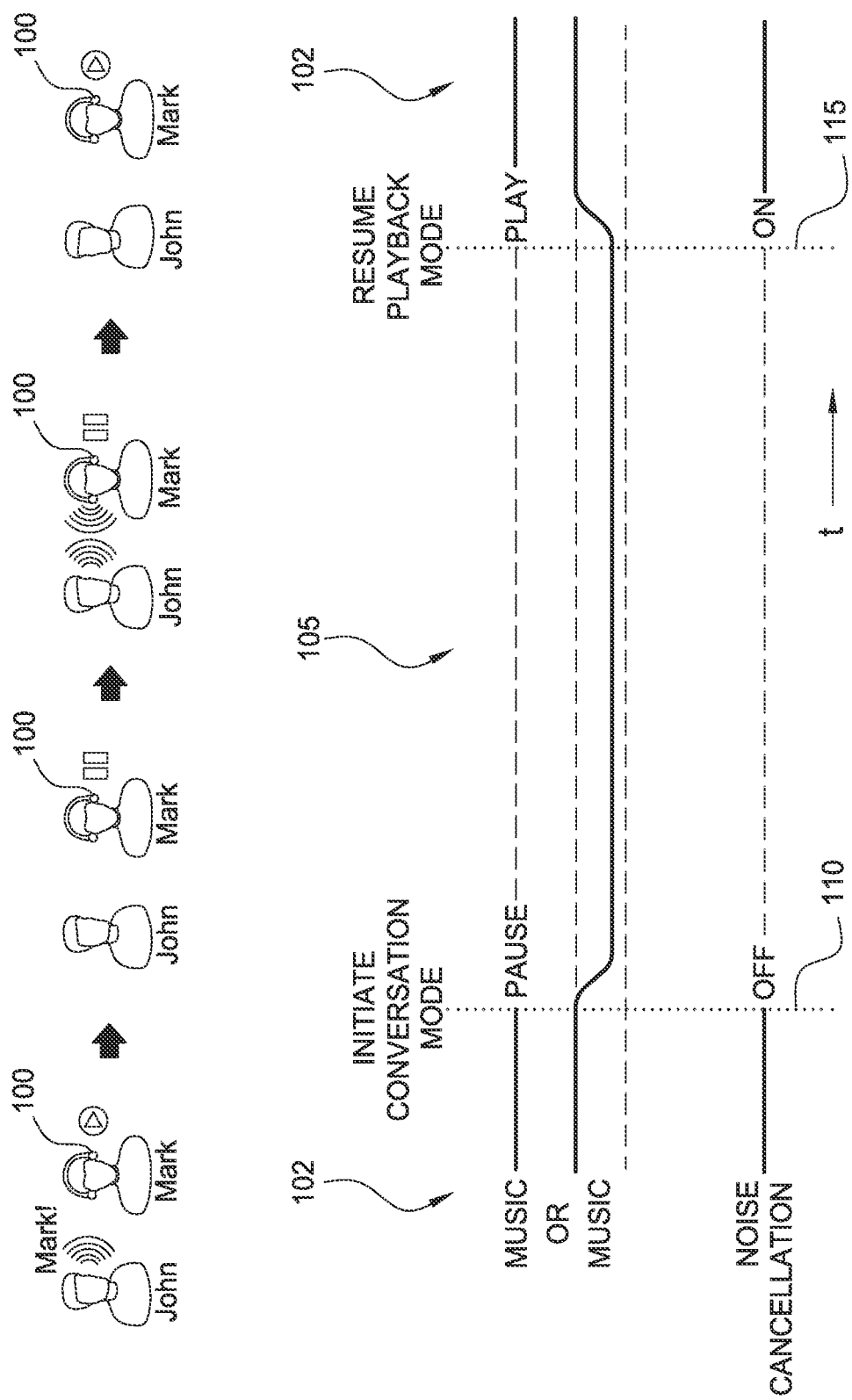
FIG. 2 illustrates a technique for disabling a noise-cancellation function of the listening device of FIG. 1 in response to detecting a voice trigger, according to various embodiments of the present invention.

FIG. 2 illustrates a technique for pausing or attenuating an audio stream being reproduced by the listening device 100 of FIG. 1 and disabling a noise-cancellation function of the listening device 100 in response to detecting a voice trigger, according to various embodiments of the present invention. As described above, using a listening device, such as listening device 100, reduces a user's ability to hear and communicate with others. As a result, the user may be unable to communicate with others when using the listening device 100 and may not be able to hear when someone is attempting to get his or her attention. As such, the listening device 100 may be configured to determine that someone is trying to get the user's attention and, in response, the listening device 100 may pause or attenuate an audio stream to which the user is listening. In various embodiments, this determination is made by detecting a voice trigger, such as the name of the user of the listening device 100. For example, and without limitation, as shown in FIG. 1, the listening device 100 may detect that someone has spoken the user's name and, in response, the listening device 100 may enter a conversation mode 105 at time 110. While the listening device 100 is in the conversation mode 105, the audio stream being reproduced by the listening device 100 may be paused or attenuated. Accordingly, the user is notified that someone is attempting to get his or her attention and is provided with an opportunity to communicate with that person.

Upon detecting a voice trigger, the listening device 100 may transmit a pause command or attenuation command to the media player. In addition to pausing or attenuating an audio stream being reproduced by the listening device 100, if the listening device 100 includes a noise-cancellation function, then the noise-cancellation function may be temporarily disabled while the listening device is in the conversation mode 105. Disabling the noise-cancellation function allows the user of the listening device 100 to hear ambient sound, including the voice of the person who is attempting to get the user's attention. Additionally, by disabling the noise-cancellation function, the user can participate in a conversation with others.

Once the user is finished communicating with others, the user may resume the playback mode 102, as shown at time 115. Upon resuming the playback mode 102, the audio stream is resumed and noise cancellation may be enabled, allowing the user to continue enjoying the audio stream. In some embodiments, the playback mode 102 may be resumed in response to a playback command issued by the user. For example, and without limitation, after the user is finishing with a conversation, the user may press a button on the listening device 100 or on a media player to which the listening device 100 is connected to resume the playback mode 102. In one example, a button that enables the user to resume playback may be located on a cable, such as a headphone cable, that couples the listening device 100 to the media player. In other embodiments, the listening device 100 may determine that no voices have been detected for a threshold period of time and, in response, the listening device 100 may automatically resume the playback mode 102. In yet another embodiment, the listening device 100 may determine that a particular person's voice has not been detected for a threshold period of time and, in response, the listening device 100 may automatically resume the playback mode 102. This determination may be based on voice parameters stored in the listening device 100, as is described in further detail below in conjunction with FIG. 6.

A voice trigger may include the name of the user of the listening device 100. In some embodiments, the voice trigger(s) may be selected by the user of the listening device 100 and stored in a memory associated with the listening device 100. The user may select and store multiple voice triggers, including shortened versions of the user's given name or surname, nicknames, and/or other words or phrases that may be used to initiate a conversation with the user. In other embodiments, the voice trigger(s) may be based on the speech patterns and/or voice parameters of one or more specific persons. For example, and without limitation, the listening device 100 may be configured to analyze ambient sound and enter the conversation mode 105 only when the voice of a friend, family member, or co-worker is detected. Accordingly, the user will not be interrupted if a stranger or unauthorized person uses a word or phrase associated with a voice trigger.

A voice trigger may be detected via the one or more microphones 140 associated with the listening device 100. For example, and without limitation, the one or more microphones 140 may be disposed on the listening device 100, enabling the listening device 100 to more accurately monitor ambient sound at the ear-level of the user. In other embodiments, one or more microphones 140 may be disposed on a cable associated with the listening device 100 and/or in a media player to which the listening device 100 is connected (e.g., via a wired connection or wireless connection). Additionally, processing of ambient sound acquired by the one or more microphones 140 may be performed by a computing device 120 included in the listening device 100 and/or included in a media player to which the listening device 100 is connected.

Figure 3:
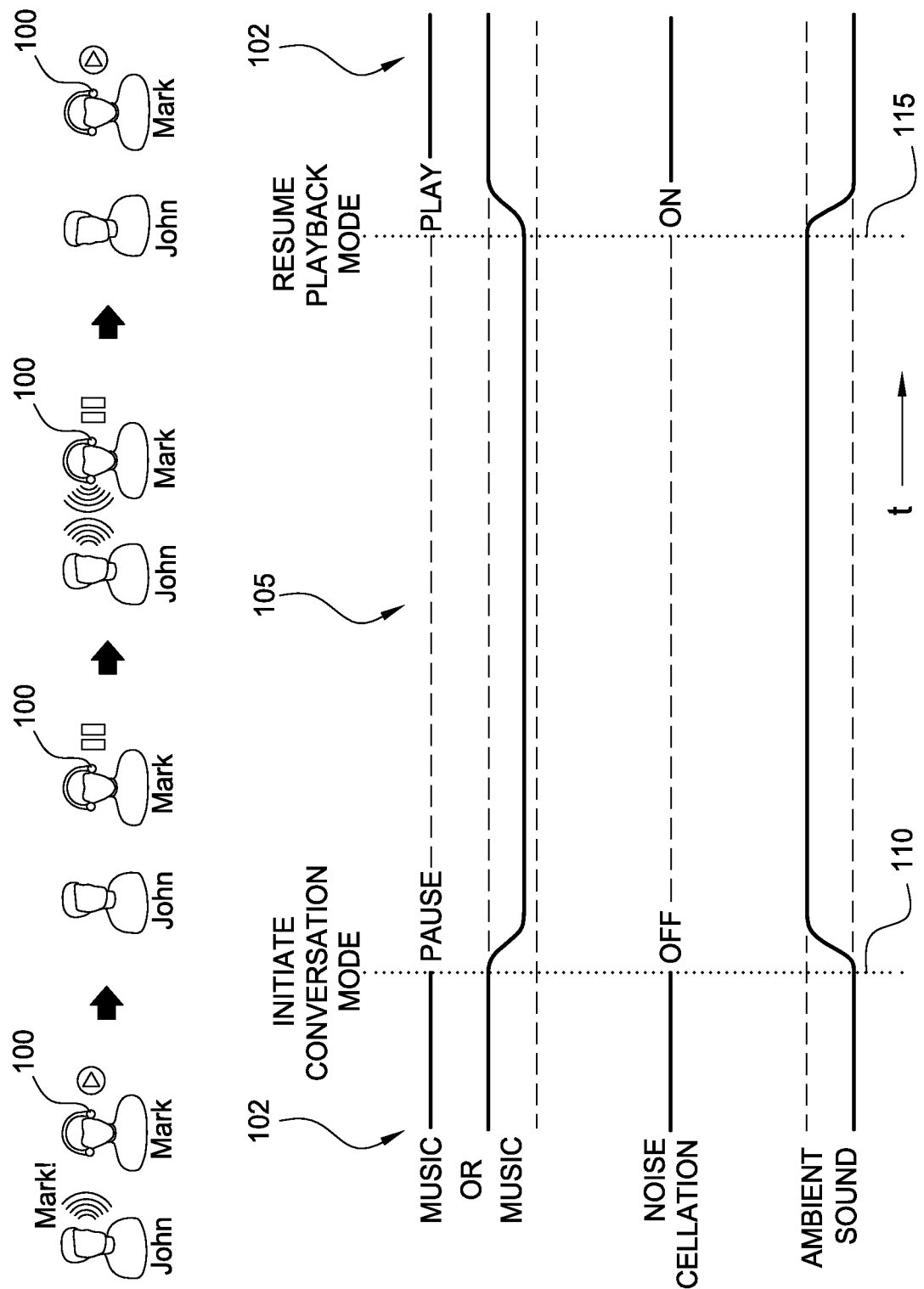
FIG. 3 illustrates a technique for reproducing ambient sound with the listening device of FIG. 1 in response to detecting a voice trigger, according to various embodiments of the present invention.

FIG. 3 illustrates a technique for reproducing ambient sound with the listening device 100 of FIG. 1 in response to detecting a voice trigger, according to various embodiments of the present invention. As shown, a voice trigger is detected by the listening device 100 at time 110 and, in response, the listening device 100 enters a conversation mode 105. While in the conversation mode 105, an audio stream being reproduced by the listening device 100 is paused or attenuated, and ambient sound acquired by the listening device 100 is reproduced for the user.

As described above, the listening device 100 may include noise-isolating characteristics. For example, and without limitation, many types of headphones (e.g., circumaural, in-ear monitors (IEMs), etc.) are configured provide passive noise-isolation by forming a seal with the user's head and/or ear canal. Consequently, at time 110, even when the optional active noise-cancellation is disabled, the user may be unable to hear ambient sounds, such as voices. Accordingly, the listening device 100 may operate in an acoustically transparent mode such that ambient sound that has been acquired by the one or more microphones 140 associated with the listening device 100 is reproduced for the user. Reproducing ambient sound with the listening device 100 enables the user to participate in a conversation or listen to the surrounding environment without removing the listening device 100.

Ambient sound may be reproduced by the listening device 100 in a spatially correct manner. In some embodiments, the listening device 100 may acquire the ambient sound using more than one microphone 140 and reproduce the ambient sound using multiple audio channels (e.g., two or more audio channels) such that the user perceives the ambient sound as coming from the correct direction. For example, if ambient sound is being received from a direction to the right of the user, then the listening device 100 may reproduce the ambient sound at a higher level in the right audio channel than in the left audio channel. Thus, in such embodiments, the listening device 100 operates in an acoustically transparent mode such that ambient sound is reproduced with spatial accuracy.

Furthermore, in embodiments where the listening device 100 is an assistive device, such as a hearing aid, ambient sound may be amplified to an elevated level to enable a user with a hearing impairment to hear voices and other ambient sounds. For example, and without limitation, the listening device 100 may detect that a person has spoken the user's name. In response, the listening device 100 may acquire and amplify the ambient sound to an appropriate level, enabling a user with a hearing impairment to more effectively communicate and interact with others.

Once the user is finished communicating with others, the listening device 100 may resume the playback mode 102 at time 115. Once the playback mode 102 is resumed, noise cancellation may be enabled and the reproduction of ambient sound may be terminated. Resuming the playback mode 102 may be performed according to any of the manual techniques and/or automatic techniques described above in conjunction with FIG. 2.

Figure 4A:
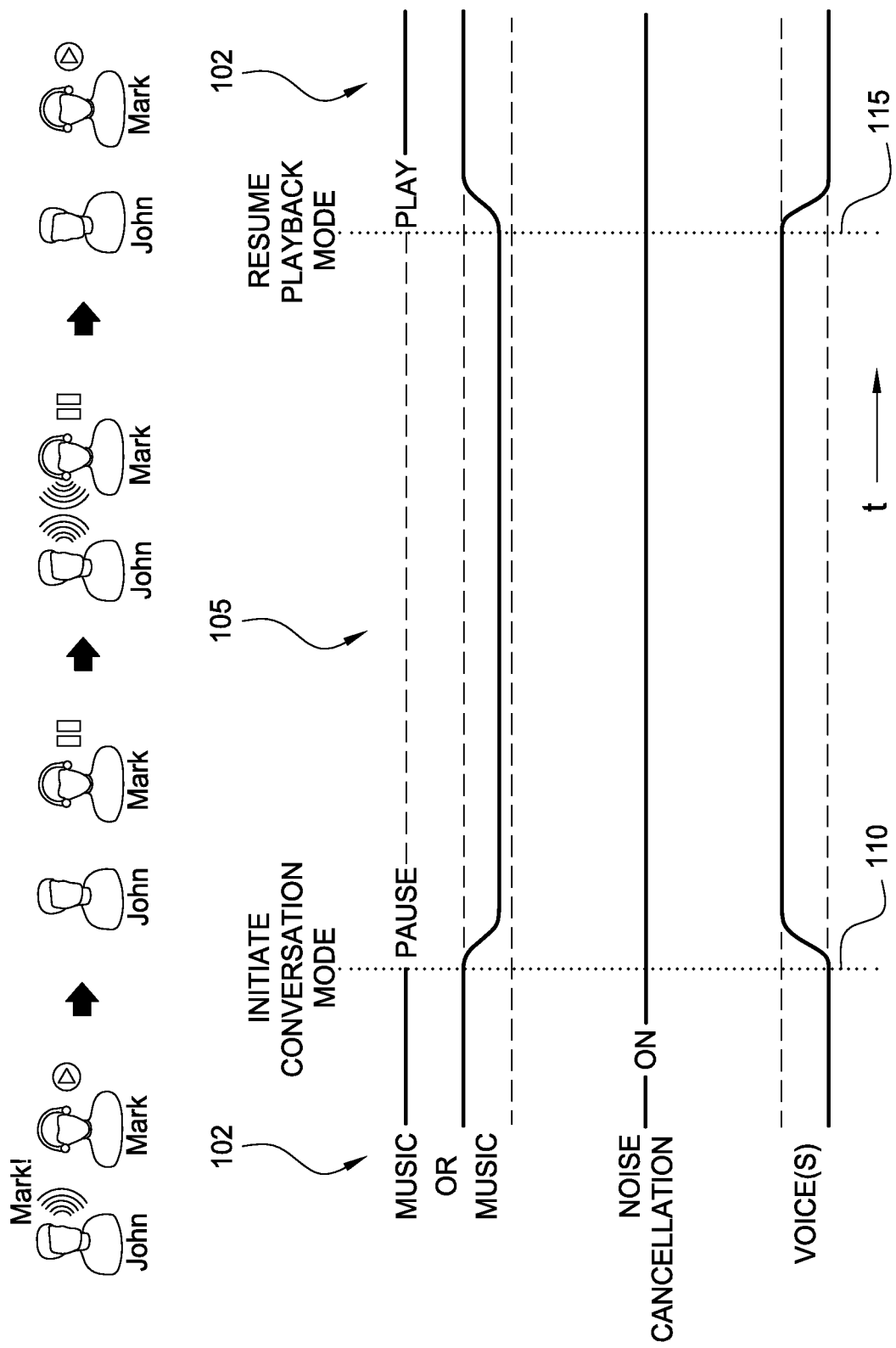
FIG. 4A illustrates a technique for processing ambient sound to enhance one or more voices in response to detecting a voice trigger, according to various embodiments of the present invention.

FIG. 4A illustrates a technique for processing ambient sound to enhance one or more voices with the listening device 100 of FIG. 1 in response to detecting a voice trigger, according to various embodiments of the present invention. As shown, a voice trigger is detected by the listening device 100 at time 110 and, in response, the listening device 100 enters the conversation mode 105. While in the conversation mode 105, an audio stream being reproduced by the listening device 100 is paused or attenuated, and voice(s) acquired by one or more microphones 140 associated with the listening device 100 are reproduced for the user.

Under certain circumstances, a user of the listening device 100 may wish to keep the optional noise-cancellation function enabled while communicating with others. For example, in a noisy environment, such as at a busy workplace or on an airplane, the user may want to hear only the voice(s) of the person(s) to which he or she is talking, but not other ambient sounds (e.g., traffic noise, noises associated with office equipment, etc.). Consequently, upon entering the conversation mode 105 at time 110, the listening device 100 may continue to perform noise-cancellation. However, in order to enable the user to communicate with others without removing the listening device 100, the listening device 100 may enhance one or more voices in the ambient sound and reproduce the voice(s) for the user. Alternatively, the noise-cancellation function may be modified such that the user is able to hear voice(s) but cannot hear other ambient sounds. That is, the noise-cancellation function may be configured to perform noise-cancellation on ambient sounds other than voices, allowing the voices to pass through to the user. As a result, the user can participate in a conversation without being distracted by other sounds in a noisy environment. In yet another embodiment, the user is able to hear the voices of one or more specific people, but noise-cancellation is performed with respect to other voices. In such embodiments, the user is able to speak to one or more specific people without being distracted by the voices of others in the surrounding environment.

In order to enhance and reproduce voice(s) included in ambient sound, one or more microphones 140 associated with the listening device 100 are used to acquire the ambient sound. The computing device 120 (or by another processor associated with the listening device 100) then processes the ambient sound to isolate the voice(s) from other ambient sounds and/or to amplify the voice(s) relative to the other ambient sounds. In some embodiments, the ambient sound is processed by filtering the ambient sound to discard one or more frequency ranges. For example, and without limitation, the ambient sound may be filtered to retain one or more frequency ranges associated with the voice of one or more persons with which the user is communicating and discard one or more other frequency ranges. The determination of which frequency ranges should be retained and discarded when processing the ambient sound may be based on average voice parameters of the general population. For example, and without limitation, common frequency range(s) of voices of people in the general population, or a specific portion of the population, may be stored in a memory associated with the listening device 100 and used to filter the ambient sound. In addition, the determination of which frequency ranges are retained and discarded when processing the ambient sound may be based on voice parameters associated with one or more specific persons, as described below in further detail in conjunction with FIG. 6.

In other embodiments, the ambient sound is processed by filtering the ambient sound using digital signal processing. For example, and without limitation, one or more algorithms and/or mathematical models may be used to process the ambient sound and/or compare the ambient sound to digital voice parameters (e.g., a digital voice signature). The digital voice parameters may be based on voice characteristics (e.g., speech patterns, acoustic patterns, frequency ranges, etc.) of the general population, or the digital voice parameters may be based on voice characteristics of one or more specific people. Based on the comparison between the ambient sound and the digital voice parameters, ambient sound data may be then retained, modified, or discarded. The processed sound data, including the enhanced voice(s), may then be reproduced for the user by the listening device 100.

Voice(s) may be reproduced by the listening device 100 in a spatially correct manner, as described above in conjunction with FIG. 3. For example, if a voice is received from a direction to the left of the user, then the listening device 100 may reproduce the ambient sound at a higher level in the left audio channel than in the right audio channel. Thus, in such embodiments, the listening device 100 reproduces voices with spatial accuracy, enabling the user to more effectively communicate with others.

In another embodiment, the optional noise-cancellation function is disabled at time 110 and the listening device 100 acquires and reproduces one or more voices, as described above. In yet another embodiment, the listening device 100 does not include a noise-cancellation function and, at time 110, the listening device 100 acquires and reproduces one or more voices, as described above. In these embodiments, the user may be able to hear other ambient sounds while listening to voice(s) that have been enhanced and reproduced by the listening device 100. Further, in either embodiment, passive noise-isolation provided by the listening device 100 may still reduce the degree to which the user can hear ambient sound. Thus, under such circumstances, active noise-cancellation may not be necessary.

Figure 4B:
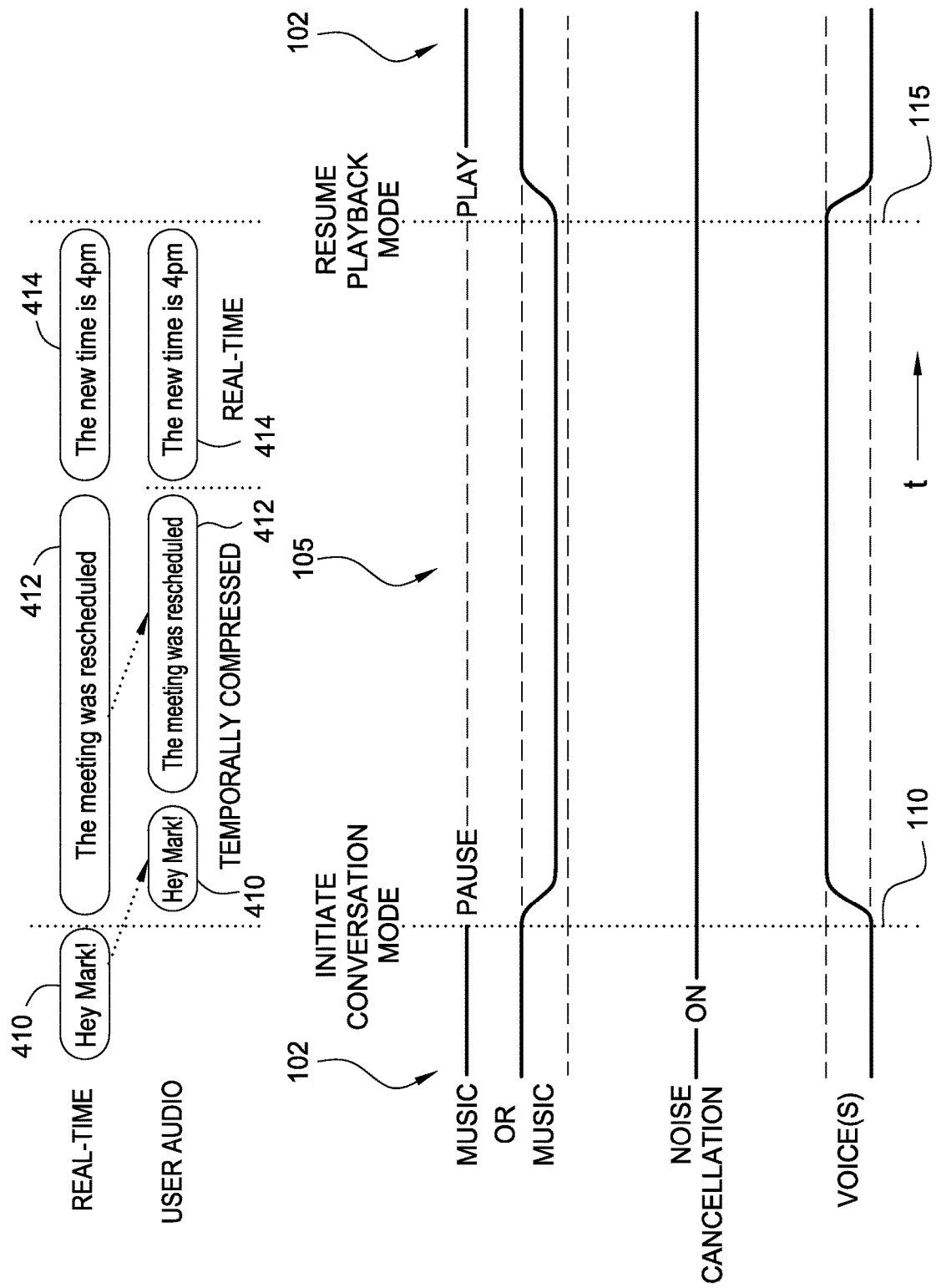
FIG. 4B illustrates a technique for temporally compressing one or more voices and reproducing the temporally compressed voice(s) with the listening device of FIG. 1, according to various embodiments of the present invention.

FIG. 4B illustrates a technique for temporally compressing one or more voices and reproducing the temporally compressed voice(s) with the listening device 100 of FIG. 1, according to various embodiments of the present invention. In addition to enhancing one or more voices included in the ambient sound, portions of the ambient sound may be temporally compressed to enable the user to hear the voice trigger and/or other sounds that occurred before the listening device 100 entered the conversation mode 105. Thus, the user is able to "catch up" to real-time while still hearing the beginning of a conversation. For example, and without limitation, as shown in FIG. 4B, a voice trigger portion 410 and conversation portion 412 may be temporally compressed and reproduced for the user. Once the user has listened to the temporally compressed portions 410, 412 of the conversation, subsequent portions of the conversation (e.g., conversation portion 414) may be reproduced in real-time.

Acquisition and temporal compression of portions of a conversation that occurred prior to the detection of a voice trigger may be performed using a circular buffer. In particular, a circular buffer enables the listening device 100 to buffer ambient sound acquired from the surrounding environment and retain the ambient sound for a given period of time. Accordingly, once a voice trigger is detected, the listening device 100 is able to access ambient sound data that was recorded during a certain period of time (e.g., seconds, minutes, etc.) prior to detection of the voice trigger. In some embodiments, the period of time before the voice trigger for which ambient sound is processed and/or reproduced is configurable. For example, and without limitation, a user may specify that, upon detecting a voice trigger, the listening device 100 should acquire, from the circular buffer, the five seconds of ambient sound or voice(s) that were recorded prior to detection of the voice trigger. The five seconds of ambient sound or voice(s) may then be temporally compressed and reproduced by the listening device 100. In other embodiments, the period of time before the voice trigger for which ambient sound is processed and/or reproduced is based on an analysis of ambient sound data stored in the circular buffer. For example, and without limitation, ambient sound recorded prior to detection of the voice trigger may be analyzed to determine the time at which the speech associated with the voice trigger began, and the ambient sound or voice(s) acquired after that time may be reproduced by the listening device 100.

Figure 5A:
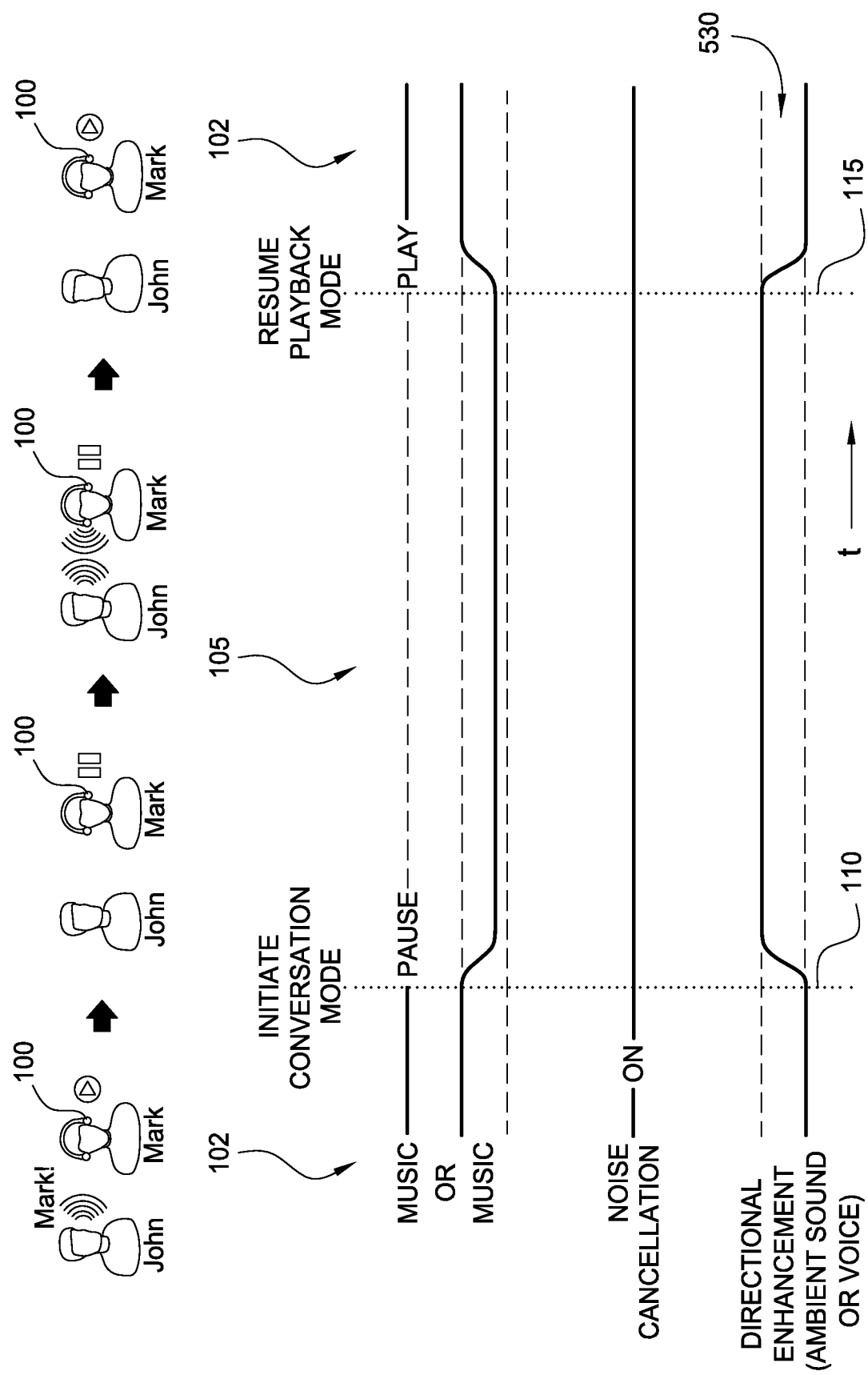
FIG. 5A illustrates a technique for enhancing ambient sound and/or voice(s) received from one or more directions in response to detecting a voice trigger, according to various embodiments of the present invention.

FIG. 5A illustrates a technique for enhancing ambient sound or voice(s) received from one or more directions and reproducing the ambient sound or voice(s) with the listening device 100 of FIG. 1 in response to detecting a voice trigger, according to various embodiments of the present invention. As described above in conjunction with FIGS. 3 and 4A, ambient sound or voice(s) may be reproduced by the listening device 100 in a spatially correct manner. That is, the listening device 100 may acquire the ambient sound using multiple microphones 140 and reproduce the ambient sound using multiple audio channels such that the user perceives the ambient sound as coming from the correct direction. However, in addition to spatially correct reproduction, the listening device 100 may enhance ambient sound or voice(s) 530 coming from one or more directions relative to an orientation of the user. For example, the one or more microphones 140 with which ambient sound is acquired may be used to determine the direction from which a voice trigger was received. The listening device 100 may then enhance ambient sound or voice(s) 530 that are subsequently received from that direction. Further, the enhanced ambient sound or voice(s) 530 received from the one or more directions may optionally be reproduced for the user in a spatially accurate manner. As a result, the listening device 100 may reproduce ambient sound or voice(s) 530 from one or more directions while attenuating or removing other ambient sound or voice(s) that may distract the user.

Figure 5C:
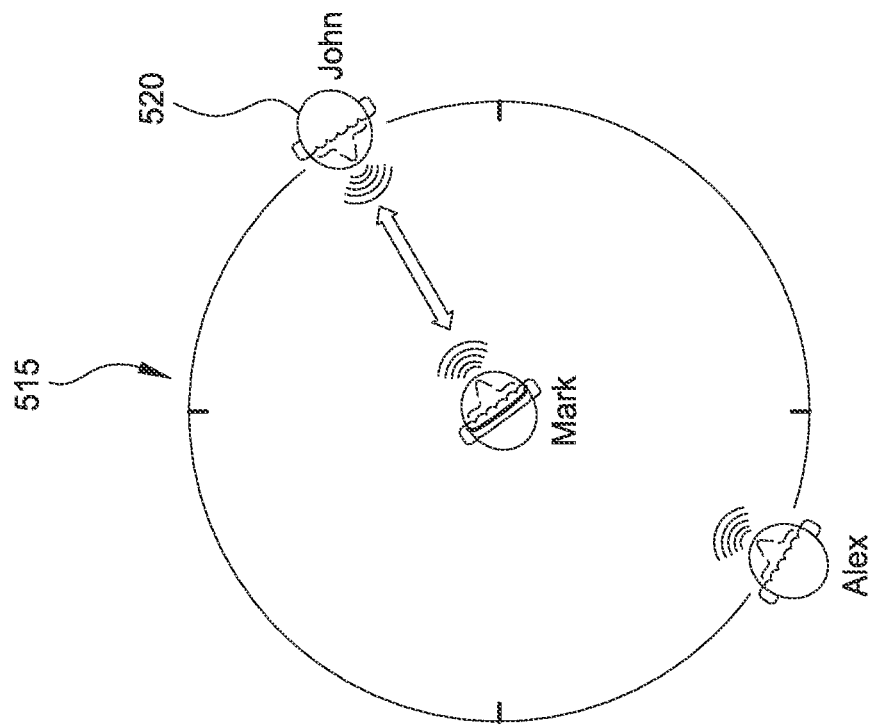
FIGS. 5B and 5C are conceptual diagrams illustrating ambient sound received from various directions relative to an orientation of the user of the listening device of FIG. 1, according to various embodiments of the present invention.
Figure 5B:
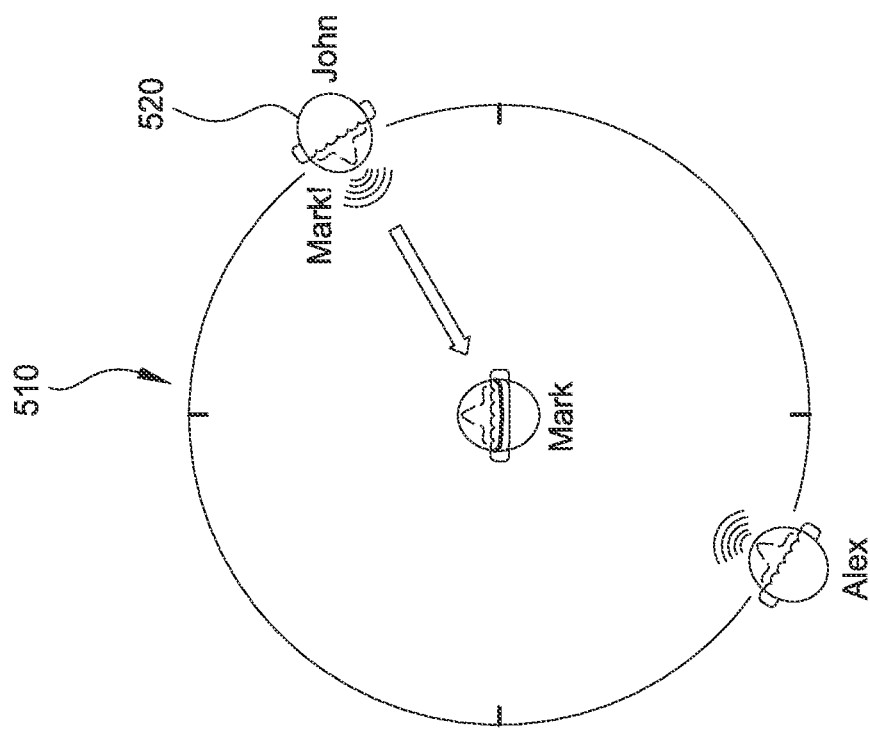

After determining the direction(s) from which ambient sound or voice(s) are being received, the orientation of the user relative to ambient sound or voice(s) may change. For example, a voice trigger may be received from one direction relative to the user. However, upon hearing the voice trigger, the user may turn to look at the person to whom he or she is speaking Consequently, the orientation of the user relative to the direction from which the voice trigger was received may change. This scenario is depicted in FIGS. 5B and 5C, which are conceptual diagrams illustrating ambient sound received from various directions relative to an orientation of the user of the listening device 100, according to various embodiments of the present invention. As shown, at time 510, a voice trigger is detected by the listening device 100 from a certain direction relative to the orientation of the user. For example, and without limitation, the microphones 140 associated with the listening device 100 may be used to determine that the voice trigger was received from a direction that is approximately 60 degrees from the direction that the user is facing. However, at time 515, when the user turns to look at the interlocutor 520, the interlocutor 520 is directly in front of the user, as shown in FIG. 5C. Accordingly, the listening device 100 may include one or more sensors that are designed to track the movement of the user and/or the movement of people around the user. For example, and without limitation, the listening device 100 may include a compass that tracks the direction from which a voice trigger was received. The listening device 100 may then enhance ambient sound or voice(s) from that particular direction, even when the user changes his or her orientation. For example, with respect to FIG. 5C, the listening device 100 may determine (e.g., based on a compass measurement), that the voice trigger was received from a direction that is now approximately directly in front of the user (i.e., zero degrees). Thus, in FIGS. 5B and 5C, the user may participate in a conversation with John without being interrupted by Alex despite changes to the user's orientation.

Additionally, the listening device 100 may include visual sensors 150 (e.g., cameras, light sensors, etc.) that detect the movement of people around the user and adjust the directions from which ambient sound or voice(s) are enhanced based on the movement. For example, and without limitation, a visual sensor 150 may determine that the interlocutor 520 was previously located in a direction that was approximately 60 degrees relative the direction that the user was facing, but, after a change to the orientation of the user, the interlocutor 520 is now directly in front of the user. Accordingly, the listening device 100 will then enhance ambient sound or voice(s) received from a direction that is directly in front of the user. Further, the listening device 100 may continue to track the location(s) of the person(s) to which the user is talking and enhance ambient sound or voice(s) received from those locations, such as if Mark continues to change his head orientation and/or if Mark and John begin to move with respect to one another.

Although FIG. 5A illustrates that the optional noise-cancellation function may be enabled when the listening device 100 enters the conversation mode 105, in other embodiments, the noise-cancellation mode may be disabled when entering the conversation mode 105. In still other embodiments, the listening device 100 may not include a noise-cancellation mode and may instead rely on passive noise-isolation.

Figure 6:
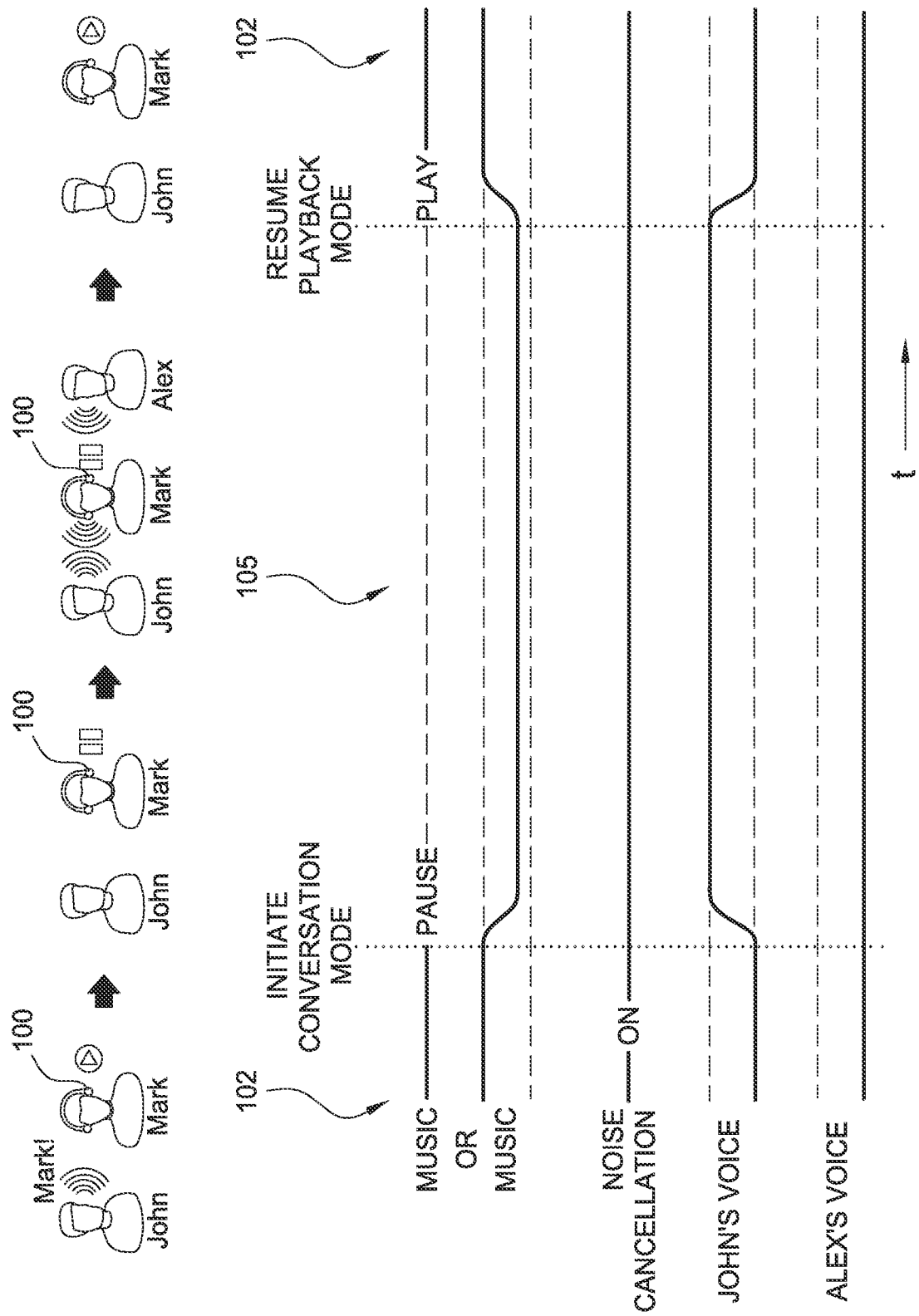
FIG. 6 illustrates a technique for processing ambient sound to enhance the voice of a specific person in response to detecting a voice trigger, according to various embodiments of the present invention.

FIG. 6 illustrates a technique for processing ambient sound to enhance the voice of a specific person and reproducing the voice with the listening device 100 of FIG. 1 in response to detecting a voice trigger, according to various embodiments of the present invention. As described above, voice parameters (e.g., digital voice parameters, frequency ranges, etc.) associated with one or more specific people may be acquired and stored in a memory associated with the listening device 100. As such, the listening device 100 may distinguish a specific person's voice from other voices included in the ambient sound, enabling the listening device 100 to enhance and reproduce only that specific person's voice for the user.

In various embodiments, voice parameters may be acquired and stored for a specific person using a training sequence, such as a sequence of words that the person speaks into a microphone (e.g., microphone 140) associated with the listening device 100. The computing device 120 may then analyze the sequence of words to determine the frequency range(s) of the person's voice as well as the other voice characteristics described above. In other embodiments, voice parameters may be acquired by a separate device and transmitted to and stored in a memory associated with the listening device 100 at a later time. In still other embodiments, voice parameters may be acquired based at least partially on the voice trigger that is detected by the listening device 100. For example, and without limitation, upon detecting a voice trigger, the listening device 100 may analyze the speaker's voice and determine voice parameters, such as the frequency range(s) of the person's voice or a digital signature associated with the voice. The voice parameters may then be used to enhance that specific person's voice, enabling the user of the listening device 100 to participate in a conversation with a person for which voice parameters were not previously stored.

As shown in FIG. 6, the listening device 100 is using voice parameters associated with John's voice to enhance his voice and reproduce the voice for the user. However, Alex's voice, which includes different voice parameters than John's voice, is not enhanced by the listening device 100. Consequently, the user is able to hear John's voice, but may not be able to hear Alex's voice. Although FIG. 6 shows that the sound level of Alex's voice is zero, in some embodiments, John's voice parameters may share commonalities with Alex's voice parameters. As a result, although the user will hear a louder reproduction of John's voice relative to Alex's voice, the user may still be able to hear Alex' voice (e.g., at a lower sound level).

As described above, although FIG. 6 illustrates that the optional noise-cancellation function may be enabled when the listening device 100 enters the conversation mode 105, in other embodiments, the noise-cancellation mode may be disabled when entering the conversation mode 105. In still other embodiments, the listening device 100 may not include a noise-cancellation mode and may instead rely on passive noise-isolation.

Figure 7:
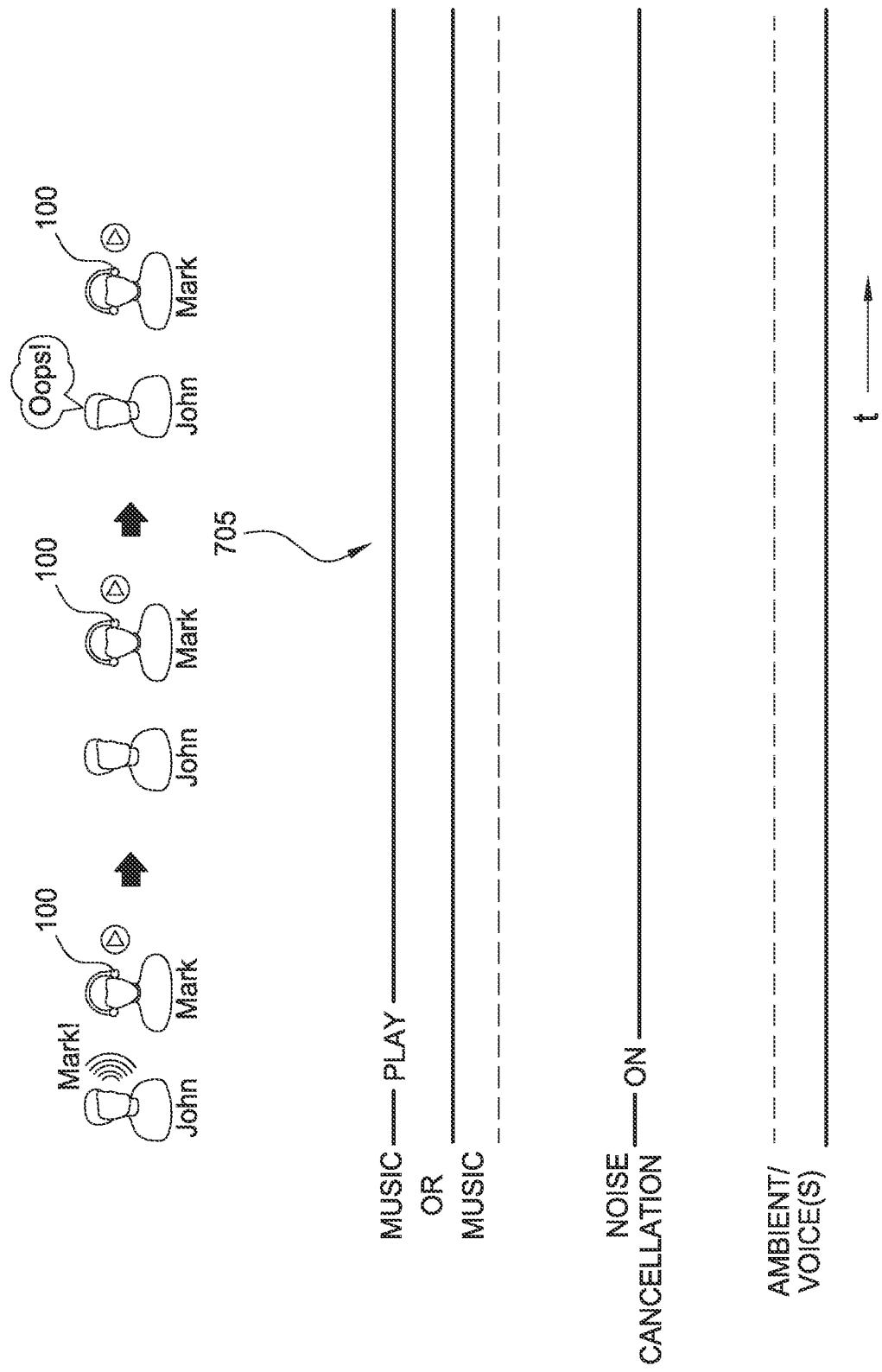
FIG. 7 illustrates a technique for effecting a do-not-disturb mode with the listening device of FIG. 1, according to various embodiments of the present invention.

FIG. 7 illustrates a technique for effecting a do-not-disturb mode 705 with the listening device 100 of FIG. 1, according to various embodiments of the present invention. Under certain circumstances, a user may not want to be disturbed by others. Accordingly, the user may place the listening device 100 in a do-not-disturb mode 705. While the do-not-disturb mode 705 is enabled, the listening device 100 does not enter the conversation mode 105 in response to voice triggers. Thus, when someone uses a voice trigger, the listening device 100 continues to play the audio stream and the optional noise-cancellation function remains enabled.

Additionally, the listening device 100 may include one or more visual indicators and/or auditory indicators that indicate to others that the user does not want to be disturbed. For example, and without limitation, the listening device 100 may contain one or more lights (e.g., light-emitting diodes (LEDs)) that glow a certain color (e.g., red) when the listening device 100 is in the do-not-disturb mode 705 and glow a different color (e.g., green) when the listening device 100 is not in the do-not-disturb mode 705. In other embodiments, the listening device 100 may be made of a translucent material such that the listening device 100 itself glows a certain color when the do-not-disturb mode 705 is enabled and glows a different color when the do-not-disturb mode 705 is not enabled. In still other embodiments, the listening device 100 may display text (e.g., "Do Not Disturb!") using various display technologies, such as an organic light-emitting diode (OLED) display, when the do-not-disturb mode 705 is enabled. Further, the listening device 100 may include one or more speakers that generate a do-not-disturb indicator. For example, and without limitation, the listening device 100 may generate a do-not-disturb indicator, such as a beeping sound, when someone attempts to talk to the user of the listening device 100. In other embodiments, the listening device 100 may transmit a do-not-disturb indicator to a communication program (e.g., a text or audio/video conferencing program) running on an external computer. For example, and without limitation, the listening device 100 may transmit a message or status update to a communication program indicating that the user of the listening device 100 does not want to be disturbed.

While the listening device 100 is in the do-not-disturb mode 705, ambient sound may be recorded and stored in a memory associated with the listening device 100 to enable the user to listen to what was missed at a later time. In some embodiments, a replay of ambient sound may be initiated in response to a replay command issued by the user. For example, and without limitation, in order to initiate a replay of ambient sound, the user may press a button on the listening device 100, a button on a media player to which the listening device 100 is connected, and/or a button on a cable, such as a headphone cable, that couples the listening device 100 to the media player. In other embodiments, the listening device 100 may initiate a replay of ambient sound in response to a voice command or a gesture, such as a hand gesture or a head gesture, issued by the user. In addition, the recorded ambient sound may be analyzed by the listening device 100 to determine (e.g., using voice parameters) the identities of the people who were talking while the listening device 100 was in the do-not-disturb mode 705.

Figure 8:
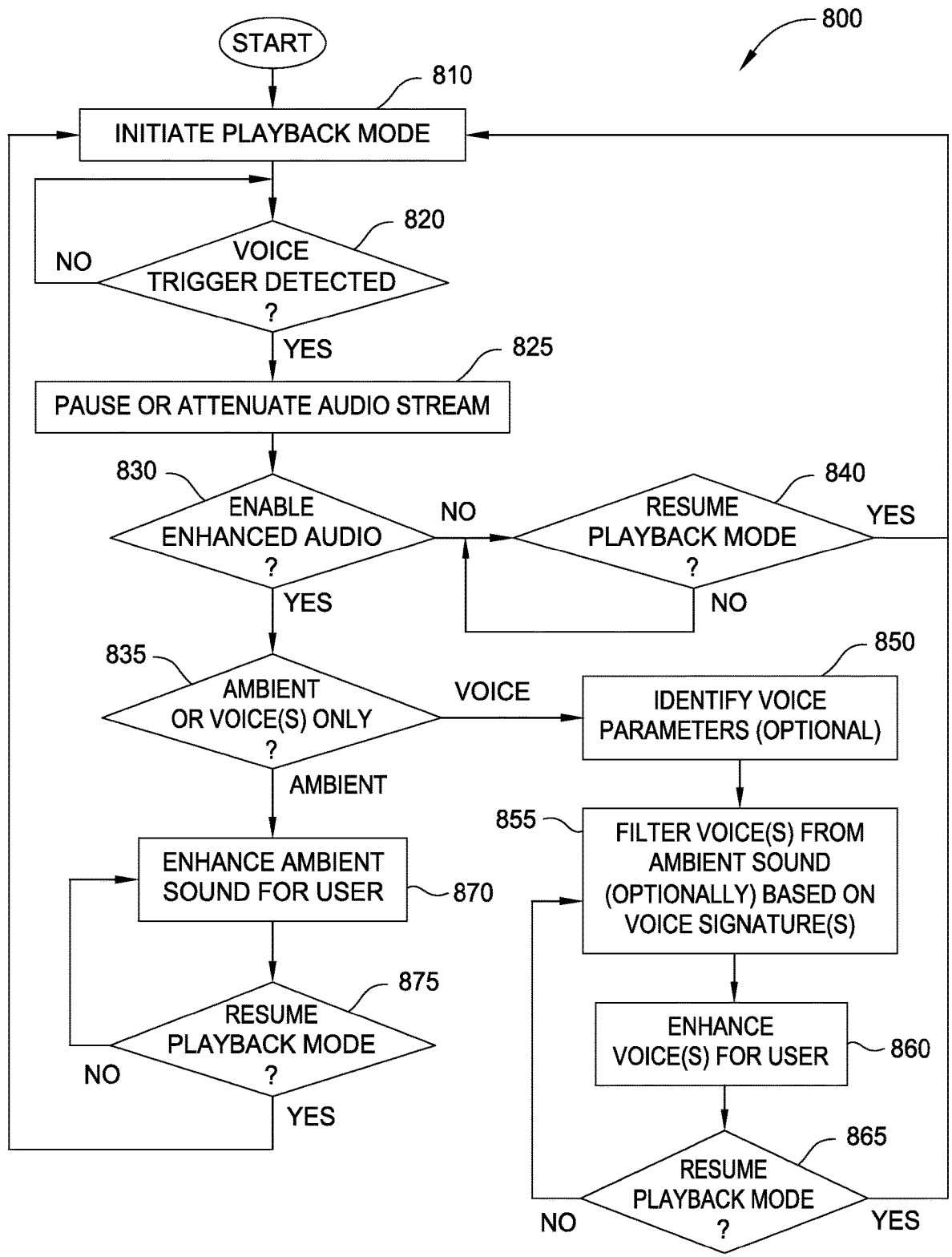
FIG. 8 is a flow diagram of method steps for providing an audio enhancement to a user of a listening device in response to a voice trigger, according to various embodiments of the present invention.

FIG. 8 is a flow diagram of method steps for providing an audio enhancement to a user of a listening device in response to a voice trigger, according to various embodiments of the present invention. Although the method steps are described in conjunction with FIGS. 1-6, persons skilled in the art will understand that any system configured to perform the method steps, in any order, falls within the scope of the present invention.

As shown, a method 800 begins at step 810, where the listening device 100 initiates the playback mode 102. While in the playback mode 102, the listening device 100 reproduces an audio stream and may optionally enable a noise-cancellation function. At step 820, the listening device 100 determines whether a voice trigger has been detected using one or more microphones 140 associated with the listening device 100. If a voice trigger is not detected, then the listening device 100 remains in the playback mode 102 and continues to monitor for a voice trigger. If a voice trigger is detected, then, at step 825, the listening device 100 enters the conversation mode 105, pauses or attenuates the audio stream, and optionally disables the noise-cancellation function.

At step 830, the listening device 100 determines whether to enhance ambient audio or voice(s). If enhanced audio is not enabled, then, at step 840, the listening device 100 remains in the conversation mode 105 and determines whether the playback mode 102 should be resumed. If the playback mode 102 is to be resumed, then the method 800 returns to step 810, where the playback mode 102 is initiated.

If enhanced audio is enabled, then, at step 835, the listening device 100 determines whether to enhance ambient sound or voice(s) only. If only voice(s) are to be enhanced, then, at step 850, the listening device 100 optionally identifies voice parameters associated with one or more people. Next, at step 855, the listening device 100 filters the voice(s) from the ambient sound based on the optional voice parameters. At step 860, the enhanced voice(s) are then reproduced for the user. At step 865, the listening device 100 then determines whether to resume the playback mode 102. If the playback mode 102 is to be resumed, then the method returns to step 810, where the playback mode 102 is initiated. If the playback mode 102 is not resumed, then the method 800 returns to steps 855 and 860, where the listening device 100 continues to filter ambient sound and reproduce voice(s) for the user.

Returning now to step 835, if ambient sound is to be enhanced, then, at step 870, ambient sound is acquired by the one or more microphones 140 and reproduced by the listening device 100. Then, at step 875, the listening device 100 determines whether to resume the playback mode 102. If the playback mode 102 is to be resumed, then the method returns to step 810, where the playback mode 102 is initiated. If the playback mode 102 is not resumed, then the method 800 returns to step 870, where the listening device 100 continues to reproduce ambient sound for the user.

Figure 9:
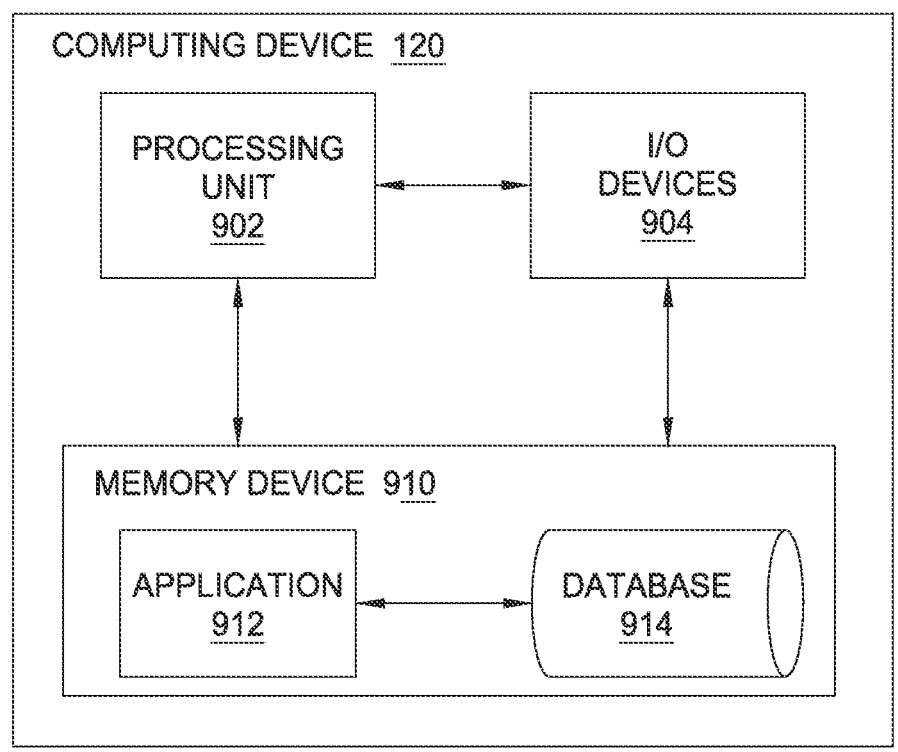
FIG. 9 is a block diagram illustrating a computer system configured to implement one or more aspects of the present invention.

FIG. 9 is a block diagram illustrating a computing device 120 that may be included within the listening device 100 of FIG. 1, according to various embodiments of the present invention. As shown, computing device 120 includes a processing unit 902, input/output (I/O) devices 904, and a memory unit 910. Memory unit 910 includes an application 912 configured to interact with a database 914.

Processing unit 902 may include a central processing unit (CPU), digital signal processing unit (DSP), and so forth. I/O devices 904 may include input devices, output devices, and devices capable of both receiving input and providing output. Memory unit 910 may store a circular buffer and may include a memory module or collection of memory modules. Software application 912 within memory unit 910 may be executed by processing unit 902 to implement the overall functionality of computing device 120, and, thus, to coordinate the operation of the listening device 100 as a whole. The database 914 may store voice triggers and voice parameters, such as frequency ranges and voice signatures.

Computing device 120 may be coupled to a sensor array that includes one or more sensors, such as one or more microphones 140 or visual sensors 150. The sensor array is configured to measure various properties of the environment within which user resides, as well as various properties associated with user (e.g., orientation). The sensor array may include any number of microphones 140, video cameras, touch sensors, heat sensors, light sensors, electrical field detectors, compasses, gyroscopes, radio transceivers, global positioning system (GPS) receivers, or any other type of sensor. Generally, the sensor array captures sensory data associated with the environment and sensory data associated with user, and provides that data to computing device 120.

Computing device 120 may also be coupled to audio output devices associated with the listening device 100 that include one or more devices, such as the speakers 130 shown in FIG. 1, configured to generate acoustic output (e.g., audio streams, ambient sound, voice(s), etc.) to the user. The audio output devices may include any number of speakers, headphones, in-ear audio devices, or any other type of device capable of generating sound.

Computing device 120 as a whole may be a microprocessor, an application-specific integrated circuit (ASIC), a system-on-a-chip (SoC), a mobile computing device such as a tablet computer or cell phone, a media player, and so forth. Generally, computing device 120 is configured to coordinate the overall operation of the listening device 100. Any technically feasible system configured to implement the functionality of the listening device 100 falls within the scope of the present invention.

In sum, the listening device detects a voice trigger associated with the name of the user of the listening device. In response, the listening device causes an audio stream being reproduced by the listening device to be paused or attenuated. The listening device then records and reproduces ambient sound for the user so that the user can hear and interact with his or her surroundings without removing the listening device. Optionally, the listening device may process the ambient sound to enhance the voices of one or more people and/or attenuate other noises or voices around the user. Further, the listening device may determine the direction from which the voice trigger was received and enhance ambient sound received from that direction. Once the user is finished conversing, the listening device may resume the audio stream.

One advantage of the techniques described herein is that the user of a listening device can listen to an audio stream without isolating himself or herself from others. Additionally, the user is able to hear when his or her name is called and converse with others without removing the listening device and without manually pausing or attenuating the audio stream. Further, the disclosed technique enables the user to indicate to others that he or she does not want to be disturbed.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. For example, although many of the descriptions herein refer to a voice trigger, persons skilled in the art will appreciate that the systems and techniques described herein are applicable to pausing an audio stream and/or reproducing ambient sound in response to any other type of auditory trigger. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method, comprising:
causing a first audio stream to be reproduced;
detecting, via a processor, a voice trigger included in ambient sound received via a microphone associated with a listening device;
in response to detecting the voice trigger:
    causing the first audio stream to be paused or attenuated;
    temporally compressing a first portion of the ambient sound having a first duration that was recorded prior to detecting the voice trigger and a second portion of the ambient sound having a second duration that was recorded after detecting the voice trigger to generate temporally compressed sound, wherein a duration of the temporally compressed sound is equal to the second duration; and
    causing a second audio stream associated with the temporally compressed sound to be reproduced and played back to a user so that the user hears all of the first portion and the second portion during the second duration to catch up to a conversation in real time at the end of the second duration.

2. The method of claim 1, further comprising detecting a first direction relative to a user from which the voice trigger was received, and generating the second audio stream by processing the ambient sound to enhance sound received from the first direction.

3. The method of claim 2, further comprising:
detecting a location of an interlocutor from which the voice trigger was received;
detecting a change to the location of the interlocutor relative to the user; and
in response, determining a second direction relative to the orientation of the user, and wherein generating the second audio stream comprises processing the ambient sound to enhance sound received from the second direction.

4. A listening device, comprising:
a speaker;
one or more microphones; and
a processor configured to:
    cause a first audio stream to be reproduced;
    detect a voice trigger included in ambient sound via the one or more microphones;
    in response to detecting the voice trigger:
        cause the first audio stream to be paused or attenuated;
        temporally compress a first portion of the ambient sound having a first duration that was recorded prior to detecting the voice trigger and a second portion of the ambient sound having a second duration that was recorded after detecting the voice trigger to generate temporally compressed sound, wherein a duration of the temporally compressed sound is equal to the second duration; and
        cause a second audio stream associated with the temporally compressed sound to be reproduced and played back to a user so that the user hears all of the first portion and the second portion during the second duration to catch up to a conversation in real time at the end of the second duration.

5. The listening device of claim 4, wherein the one or more microphones are configured to acquire the ambient sound, and wherein the listening device comprises headphones and the one or more microphones are electrically coupled to the headphones.

6. The listening device of claim 4, wherein the processor is further configured to generate the second audio stream by processing the ambient sound to enhance a first voice associated with the voice trigger.

7. The listening device of claim 6, wherein the processor is configured to process the ambient sound by filtering the ambient sound based on at least one of a frequency range associated with the first voice and one or more digital voice parameters associated with the first voice.

8. The listening device of claim 6, wherein the processor is configured to process the ambient sound by filtering the ambient sound to attenuate a second voice.

9. The listening device of claim 4, further comprising an indicator, and wherein the processor is further configured to:
determine that a user of the listening device has selected a do-not-disturb mode; and
cause the indicator to generate a do-not-disturb indicator.

10. The listening device of claim 5, wherein the one or more microphones comprise at least two microphones, and the processor is further configured to:
detect a first direction relative to a user of the listening device from which the voice trigger was received based on the ambient sound; and
generate the second audio stream by processing the ambient sound to enhance sound received from the first direction.

11. The listening device of claim 10, wherein the processor is further configured to:
detect a location of an interlocutor from which the voice trigger was received;
detect a change to the location of the interlocutor relative to the user;
in response, determine a second direction relative to the orientation of the user; and
generate the second audio stream by processing the ambient sound to enhance sound received from the second direction.

12. A non-transitory computer-readable storage medium including instructions that, when executed by a processor, cause the processor to provide audio enhancement to a user of a listening device, by performing the steps of:
causing a first audio stream to be reproduced;
detecting a voice trigger included in ambient sound; and
in response to detecting the voice trigger:
    causing the first audio stream to be paused or attenuated;
    temporally compressing a first portion of the ambient sound having a first duration that was recorded prior to detecting the voice trigger and a second portion of the ambient sound having a second duration that was recorded after detecting the voice trigger to generate temporally compressed sound, wherein a duration of the temporally compressed sound is equal to the second duration; and causing a second audio stream associated with the temporally compressed sound to be reproduced and played back to a user so that the user hears all of the first portion and the second portion during the second duration to catch up to a conversation in real time at the end of the second duration.

* * * * *